May 11, 1926.

G. CANCILLIERI

MOTOR OPERATED FAN

Filed August 1, 1922    3 Sheets-Sheet 1

1,584,609

Inventor
G. Cancillieri

By F. K. Bryant
Attorney

May 11, 1926. 1,584,609

G. CANCILLIERI

MOTOR OPERATED FAN

Filed August 1, 1922 3 Sheets-Sheet 2

Inventor
G. Cancillieri

By F. K. Bryant
Attorney

May 11, 1926.
G. CANCILLIERI
MOTOR OPERATED FAN
Filed August 1, 1922
1,584,609
3 Sheets-Sheet 3
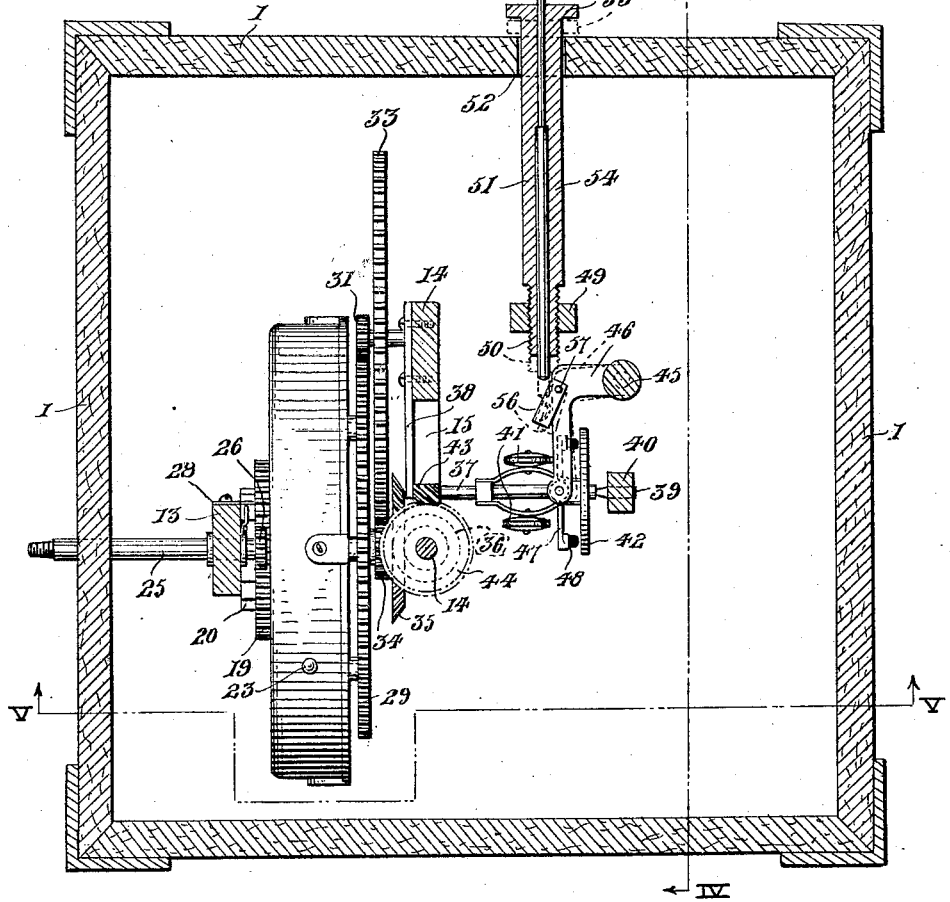
Fig. 6.
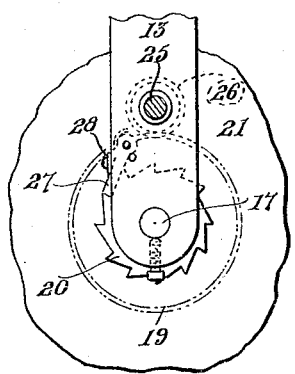
Fig. 7.
Fig. 8.
Inventor
G. Cancillieri
By F. K. Bryant
Attorney Patented May 11, 1926.

1,584,609

UNITED STATES PATENT OFFICE.

GIOVANNI CANCILLIERI, OF YATESBORO, PENNSYLVANIA.

MOTOR-OPERATED FAN.

Application filed August 1, 1922. Serial No. 578,950.

This invention relates to certain new and useful improvements in motor operated fans and has particular reference to the provision of a spring motor mechanism for rotating the fan.

One of the objects of the invention resides in the provision of a motor operated fan wherein a spring motor associated with the fan has mechanism cooperating therewith both for regulating the speed of rotation of the fan and also controlling the starting and stopping thereof.

Another object of the invention relates to improvements in a spring motor for operating a fan and more particularly the mounting and winding of a band spring forming a part of the motor with the train of gearing interposed between the spring motor and fan wheel.

With the above general objects in view and others that will appear as the nature of the invention is better understood, the same consists of the novel form, combination and arrangement of parts hereinafter more fully described, shown in the accompanying drawings and claimed.

Figure 1:
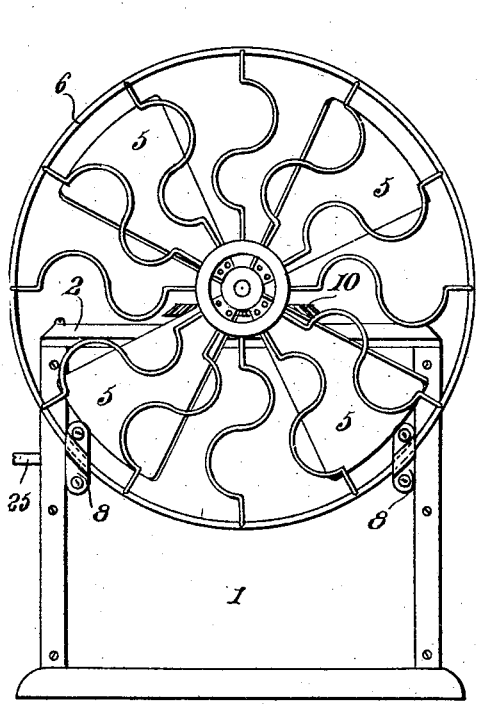
Figure 2:
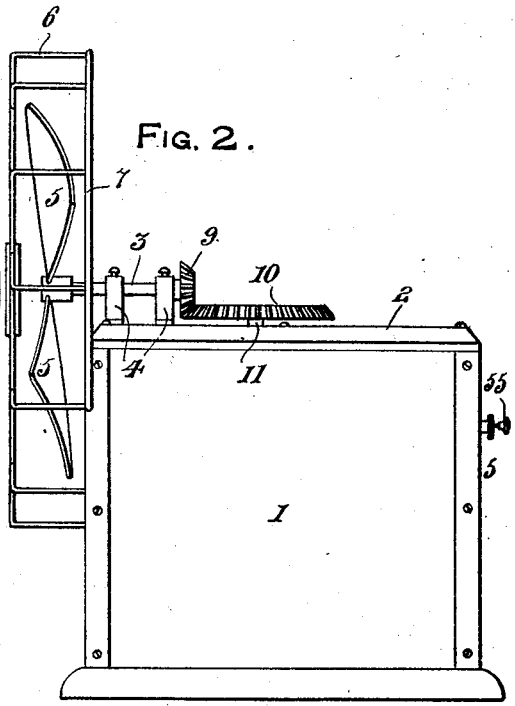
Figure 3:
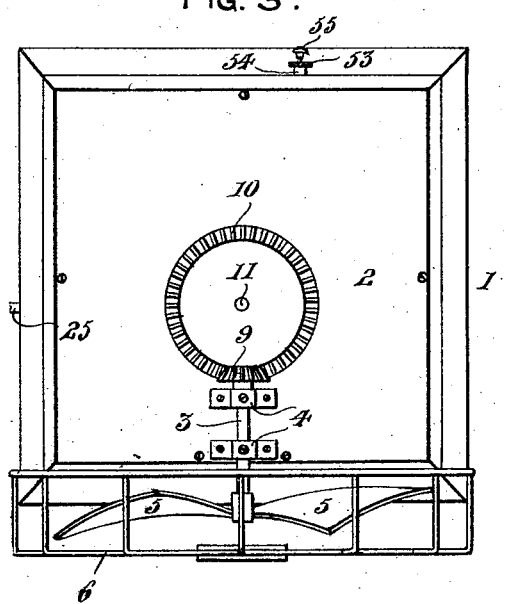
Figure 4:
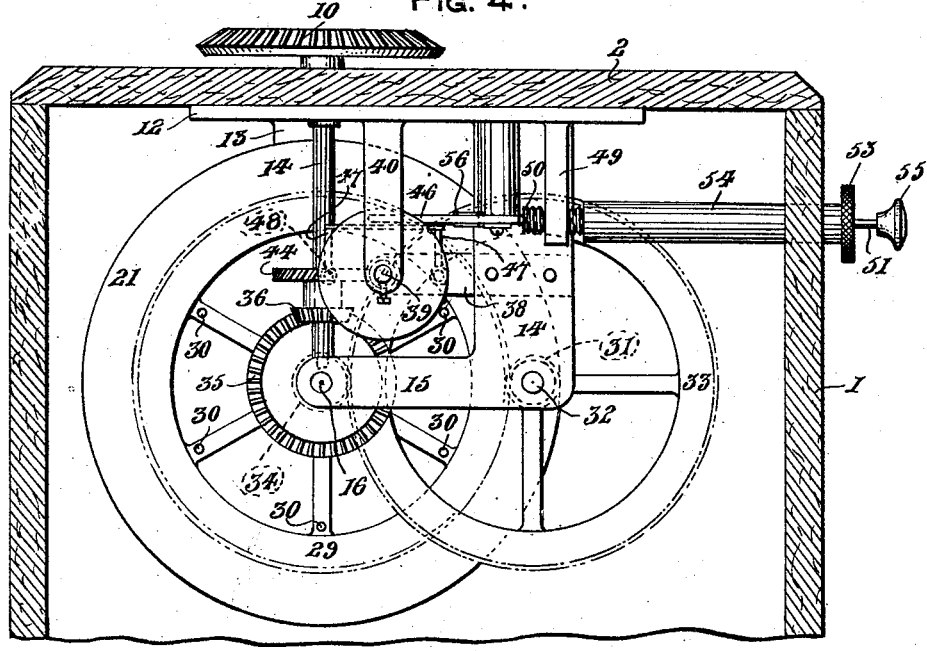
Figure 5:
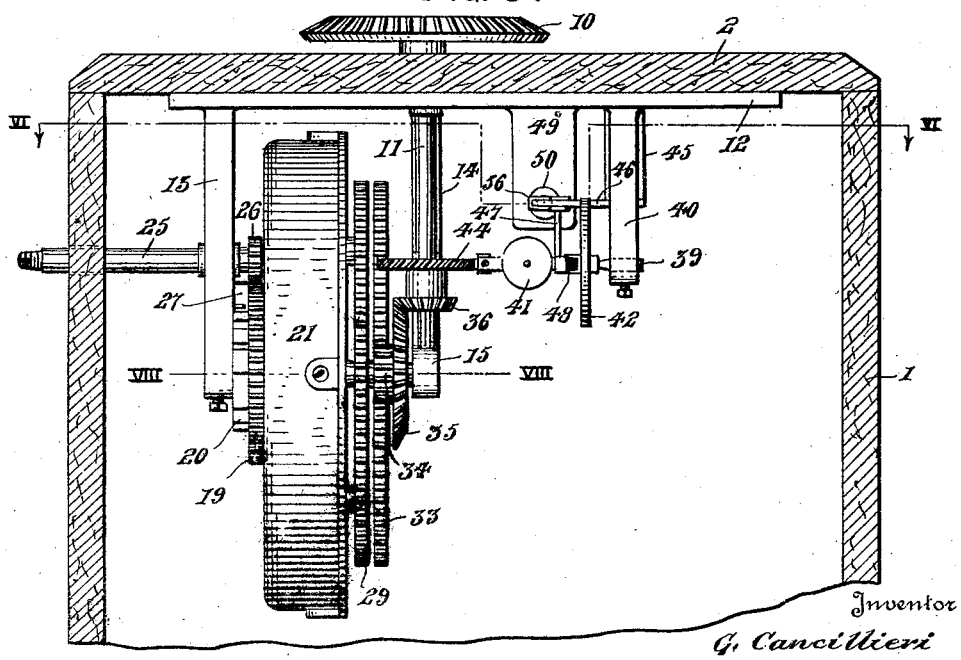

In the drawings, wherein like reference characters designate corresponding parts throughout the several views, Figure 1 is a front elevational view of a motor operated fan showing the box structure enclosing the spring motor mechanism and the fan wheel and wire guard therefor supported on the box, Figure 2 is a side elevational view of the device showing the forwardly positioned fan wheel and guard casing with the gear connection between the fan wheel and the spring motor mechanism within the casing, Figure 3 is a top plan view of the device, Figure 4 is a sectional view taken on line IV—IV of Fig. 6 showing the spring motor mechanism supported by and depending from the cover of the box casing, Figure 5 is a cross sectional view taken on line V—V of Fig. 6 showing the winding shaft and pinion for the spring motor and the train of gearing driven by the spring motor for operating the power gear of the fan wheel, Figure 6 is a cross sectional view taken on line VI—VI of Fig. 5 showing the speed control and stop devices associated with the gearing train of the spring motor, Figure 7 is a fragmentary elevational view of a portion of the spring motor mechanism showing the winding gear for the motor spring and the pawl and ratchet mechanism associated therewith, and Figure 8 is a detail sectional view taken on line VIII—VIII of Fig. 5 showing a part of the motor casing and the spring enclosed therein.

Referring more in detail to the accompanying drawings, and particularly to Figs. 1 to 3, there is illustrated a motor operated fan comprising a box like casing embodying side and end walls 1 and an upper wall or cover 2. A fan shaft 3 is journaled in bracket bearings 4 supported adjacent one edge of the cover 2, the shaft 3 projecting beyond the adjacent side wall and carrying a band wheel 5 upon the outer end thereof. A guard frame 6 incloses the fan wheel 5, the same being supported upon the forward wall of the box casing by the ring 7 of the guard frame 6 being anchored thereto by straps 8 as clearly shown in Fig. 1. The inner end of the fan shaft 3 carries a beveled pinion 9 in mesh with a beveled gear 10 fixed upon the upper end of the shaft 11 that projects through the cover 2 of the box casing, the shaft 11 being in communication with the spring motor mechanism contained within the box casing.

The spring motor mechanism within the box casing is supported by and depends from the cover 2, there being provided a plate 12 carrying a hanger 13 adjacent one side edge thereof, and an intermediately positioned angle shaped hanger embodying a vertical leg 14 and a horizontal leg 15. The free end of the horizontal leg 15 is alined with the lower end of the hanger 13, a stud shaft 16 having one end thereof fixed in the free end of the hanger arm 15 and alined with the stub shaft 17 fixed in and projecting inwardly of the hanger 13. The spring motor embodies a hub 18 axially bored at opposite sides for rotatable mounting upon the shafts 16 and 17, as clearly shown in Fig. 8, the hub 18 carrying an integrally formed gear wheel 19 and an adjacent ratchet wheel 20 employed in connection with the winding of the spring motor. The motor casing 21 is journaled on the hub 18 and the shaft 16 as shown in Fig. 8, and incloses a band spring 22 that is anchored at one end as at 23 to the peripheral wall of the motor casing, while the inner end thereof is anchored as at 24 to said hub.

A winding shaft 25 is journaled through one side wall of the box casing, and through the hanger 13, the outer projecting end thereof being suited for the reception of a crank handle, while a pinion 26 is fixed to the inner end thereof and meshes with the gear wheel 19. A pawl 27 is pivotally mounted upon the hanger 13 and is engaged by a spring 28 for normally holding the same into engagement with the ratchet wheel 20, shown more clearly in Fig. 7. The spring motor hub 18 being journaled on the shafts 16 and 17, rotation thereof is accomplished through the meshing gears 19 and 26 by rotating the winding shaft 27 for placing the band spring 22 under tension within the motor casing 21.

A train of gearing operated by the spring motor includes a relatively large gear wheel 29 fixed as at 30 to the motor casing 21 and further axially supported on the shaft 16 as shown in Fig. 8, said gear wheel 29 meshing with a pinion 31 keyed to the shaft 32 journaled in the lower end of the vertical leg 14 of said hanger, the shaft 32 supporting a relatively large gear wheel 33 shown more clearly in Fig. 4. An integral pinion 34 and bevel gear 35 are journaled on the shaft 16, the relatively large gear wheel 33 meshing with the pinion 34 for rotating the same and the bevel gear 35. The shaft 11 supporting the bevel gear wheel 10 upon the upper side of the cover wall 2 depends into said box casing and is supported at its lower end in the outer end of the horizontal leg 15 of the hanger 14, a bevel pinion 36 fixed to the shaft 11 adjacent the lower end thereof being in mesh with the bevel gear 35 for purposes of communicating power from the spring motor to the perpendicular shaft 11 as will at once be obvious.

A combined feed control and brake device is associated with the spring motor mechanism and includes a shaft 37 journaled at one end in the bracket arm 38 carried by the perpendicular leg 14 of the hanger, the other end of said pin being socketed for the reception of a pin bearing 39 adjustably carried by the hanger 40 shown more clearly in Fig. 5. A centrifugal governor 41 is mounted on the shaft 37 and carries the slidably mounted brake disk 42, said shaft 37 being rotated through the medium of the worm portion 43 engaging the worm wheel 44 fixed to the shaft 11 above the pinion 36. The brake device further includes a post 45 depending from the plate 12 and having pivotally mounted upon the lower end thereof the angle lever 46, the free end of said lever carrying a pivotally mounted frame bar 47 having brake shoes 48 at each end thereof for engagement with the adjacent face of the brake disk 42, shown more clearly in Figs. 4 to 6. A hanger 49 depending from the plate 12 has a threaded opening adjacent the lower end thereof into which the threaded end 50 of a stop rod 51 is received, the rod 51 passing through an opening 52 in a side wall 1 of the box casing and having a gripping head 53 upon the outer end thereof. The rod 51 has an axial bore through which a pin 54 is slidably mounted, the outer end of said pin being provided with a handle 55 for shifting the same. The angle lever 46 has a U-shaped strap 56 pivotally mounted thereon as at 57 to be engaged by the inner end of the pin 54 for purposes of shifting the angle lever 46 a slight distance to move the brake shoes 48 into frictional engagement with the brake disk 42, inward threaded movement of the rod 51 engaging the angle lever 46 for shifting the brake shoes carried thereby into binding engagement with the brake disk for purposes of arresting movement or operation of the spring motor.

From the above detail description of the device, it is believed that the construction and operation thereof will at once be apparent, it being noted that when it is desired to place the band spring 22 under tension, the rod 51 is axially shifted inwardly of the casing to move the brake shoes 48 into binding engagement with the brake disk 42, at which time a crank handle applied to the winding shaft 25 will rotate said shaft and through the medium of the meshing gears 26 and 19 associated with the motor hub 18 will wind the spring 22. By unscrewing, or moving outwardly the rod 51 relative to the box casing, the angle lever 46 is shifted upon its pivotal mounting on the post 45 depending from the plate 12 permitting the brake shoes 48 to become disengaged from the brake disk 42 and through the medium of the meshing gears above described, said shaft 11 is rotated and the power bevel gears meshing with the pinion upon the fan shaft 3 will effect rotation of the fan wheel. The speed of rotation may be controlled by the pin 54 engaging the U-shaped strap 56 shown more clearly in Fig. 6 for purposes of shifting the same and the angle lever 46 carrying the same will cause a slight frictional engagement between the brake shoes 48 and brake disk 42 to control the speed of rotation of the fan wheel 5.

While there is herein shown and described the preferred embodiment of the present invention, it is nevertheless to be understood that minor changes may be made therein without departing from the spirit and scope of the invention as claimed.

What I claim as new is:—

1. In a spring motor, a pair of spaced supporting hangers, a journal pin fixed to one standard and projecting therefrom toward the other standard, a hub journalled on said pin and having the end adjacent the first hanger provided with a stepped flange, one step of the flange being provided with gear teeth and the other with ratchet teeth, a spring case on said hub and supported from movement on the hub in one direction by said flange, said spring case being of cylindrical formation and having one end closely embracing the hub and the remaining end fitting over the end of the hub remote from the flange, a spiral spring in said case having one end fixed to the hub and the other to the periphery of said case, a second journal pin extending into said hub and carried by the second hanger a pawl carried by the first hanger and engaging the ratchet, a winding shaft enjournalled in the first hanger and engaging the ratchet, and a gear train having an operative connection to said case.

2. In a spring motor, a pair of spaced supporting hangers, a journal pin fixed to one standard and projecting therefrom toward the other standard, a hub journalled on said pin and having the end adjacent the first hanger provided with a stepped flange, one step of the flange being provided with gear teeth and the other with ratchet teeth, a spring case on said hub and supported from movement on the hub in one direction by said flange, said spring case being of cylindrical formation and having one end closely embracing the hub and the remaining end fitting over the end of the hub remote from the flange a spiral spring in said case having one end fixed to the hub and the other to the periphery of said case, a second journal pin extending into said hub and carried by the second hanger, a pawl carried by the first hanger and engaging the ratchet, a winding shaft journalled on the first hanger and engaging the ratchet, and a gear train having an operative connection to said case, said gear train including a gear fixed on the case, a pinion mounted on the second pin and other gears connecting said gear and pinion.

In testimony whereof I affix my signature.

GIOVANNI CANCILLIERI.